(12) United States Patent
Oshima

(10) Patent No.: US 7,869,073 B2
(45) Date of Patent: Jan. 11, 2011

(54) IMAGE FORMING SYSTEM, IMAGE FORMING METHOD AND INFORMATION TERMINAL DEVICE

(75) Inventor: Akihide Oshima, Saitama (JP)

(73) Assignee: Fuji Xerox Co., Ltd., Tokyo (JP)

(*) Notice: Subject to any disclaimer, the term of this patent is extended or adjusted under 35 U.S.C. 154(b) by 1017 days.

(21) Appl. No.: 11/178,991

(22) Filed: Jul. 12, 2005

(65) Prior Publication Data

US 2006/0215216 A1 Sep. 28, 2006

(30) Foreign Application Priority Data

Mar. 22, 2005 (JP) .............................. 2005-081694

(51) Int. Cl.
*G06F 3/12* (2006.01)
(52) U.S. Cl. .................... 358/1.15; 358/1.14; 358/1.11; 358/1.12; 358/1.13; 358/1.16; 358/1.17; 358/1.18; 709/227; 709/251
(58) Field of Classification Search .................. None
See application file for complete search history.

(56) References Cited

U.S. PATENT DOCUMENTS

| 6,430,610 | B1* | 8/2002 | Carter ........................ 709/221 |
| 6,493,100 | B1* | 12/2002 | Endo et al. ................. 358/1.14 |
| 7,095,514 | B1* | 8/2006 | Yamagata et al. .......... 358/1.14 |
| 2002/0156899 | A1* | 10/2002 | Sekiguchi .................... 709/227 |
| 2003/0169444 | A1* | 9/2003 | Kemp et al. ................ 358/1.15 |
| 2004/0057069 | A1* | 3/2004 | Ikeda ........................ 358/1.14 |
| 2006/0039290 | A1* | 2/2006 | Roden et al. ................ 370/241 |
| 2006/0119881 | A1* | 6/2006 | Zarco ........................ 358/1.15 |
| 2006/0206600 | A1* | 9/2006 | Wong et al. ................. 709/223 |

FOREIGN PATENT DOCUMENTS

| CN | 1581120 A | 2/2005 |
| EP | 1 073 253 A2 | 1/2001 |
| JP | A-10-145637 | 5/1998 |
| JP | A-10-181605 | 7/1998 |
| JP | A-2000-069066 | 3/2000 |
| JP | A-2000-295257 | 10/2000 |
| JP | A 2000-349803 | 12/2000 |

(Continued)

OTHER PUBLICATIONS

Japanese Patent Office, *Japanese Refusing Reason notice for Patent Application No. 2005-081694* (with English translation), mailed Jan. 5, 2010, pp. 1-3.

*Primary Examiner*—Edward L Coles
*Assistant Examiner*—Pawandeep S Dhingra
(74) *Attorney, Agent, or Firm*—Oliff & Berridge, PLC

(57) ABSTRACT

An image forming system comprising an information terminal device and a printing device that is connected to the information terminal device through a network and a local connection and performs a printing process of image data sent from the information terminal device, in which the information terminal device includes a network identifier acquisition unit that obtains through the local connection a network identifier of the printing device on the network at the time of the local connection between the information terminal device and the printing device, and a data communication unit that performs data communications with the printing device through the network according to the network identifier obtained by the network identifier acquisition unit.

10 Claims, 3 Drawing Sheets

FOREIGN PATENT DOCUMENTS

| | | |
|---|---|---|
| JP | A-2001-117835 | 4/2001 |
| JP | A-2001-177599 | 6/2001 |
| JP | A-2001-282648 | 10/2001 |
| JP | A-2002-218099 | 8/2002 |
| JP | A-2002-374378 | 12/2002 |
| JP | A-2003-091404 | 3/2003 |
| JP | A-2003-348276 | 12/2003 |
| JP | A-2004-098357 | 4/2004 |
| JP | B2-3597385 | 9/2004 |

* cited by examiner

IMAGE FORMING SYSTEM, IMAGE FORMING METHOD AND INFORMATION TERMINAL DEVICE

BACKGROUND OF THE INVENTION

1. Field of the Invention

The present invention relates to an image forming system, an image forming method and an information terminal device in which data communications are made between electronic equipment which are mutually connected through plural communication lines, and more particularly to an image forming system, an image forming method and an information terminal device in which mutual communications between electronic equipment can be performed by using information obtained through each communication line for data communications using another communication line.

2. Description of the Related Art

There have been developed various connection methods as communication means between electronic equipment in these years, and their typical examples include a network connection that realizes data communications by handling plural devices as nodes on a network and a P2P (Peer to Peer) connection that directly connects electronic equipment mutually. Especially, the P2P connection has a transmission speed considerably higher than that of a conventional P2P connection method, and data formats which can be processed are in various types and a large volume of data can be sent and received at a time.

While the network connection allows mutual communications between plural electronic equipment, the P2P connection is a local connection and can generally execute high-speed data communications with stability secured higher than the LAN connection.

As examples of the P2P connection, peripheral equipment such as a digital camera and a printer and a scanner and a printer are mutually connected by means of a USB (Universal Serial Bus). Among the USB connections, the connection by means of USB 2.0 high speed can realize a maximum transmission speed of 480 Mbps (Mega bit per second), so that large volumes of data can be transmitted at a high speed.

The USB can be supplied with power from the connected electronic equipment, so that it has advantages that a space for the device can be saved, and the usability can be improved.

Thus, a connection method suitable for usage can be selected. For example, where image data taken in a high-definition processing mode is transferred to a printer, communications can be made safely and at a higher speed by performing data communications by means of the USB 2.0 high-speed connection than by the network connection because a data size is large. On the other hand, where data communications are made with plural nodes at a time, the network connection is superior to the local connection.

According to a connection method that electronic equipment is connected by plural communication means of the network connection and the local connection, it is recognized as different electronic equipment by the individual communication means. In other words, one electronic equipment is recognized as different electronic equipment by the individual communication means. For example, where a scanner and a printer are mutually connected by two communication means, the network connection and the USB connection which is a local connection, the printer is managed as network connection printer and USB connection printer according to the system management by the scanner.

Therefore, the data communications between the electronic equipment having plural communication means have a disadvantage that the working efficiency drops because a connection process is executed by each of the communication means and a data format according to the specifications of each communication means must be used.

In order to have the electronic equipment, which is recognized as different electronic equipment by the individual communication means, recognized as one and the same, there are problems that registration by an administrator is required and re-registration must be made every time there is a change.

There is disclosed as a related art Japanese Patent Application Laid-Open No. 2000-349803 that a non-IP peripheral device, which is not allotted an IP address necessary for network communications and cannot be connected directly to the Internet, can be accessed remotely through the Internet.

According to the related art disclosed in Japanese Patent Application Laid-Open No. 2000-349803, a gateway device holds an IP (Internet Protocol) address management table which stores a controlled product as a non-IP peripheral device at home and an IP address allotted to the controlled product in correspondence with each other, the IP address is identified from the Internet data received through the Internet, and data can be sent to the controlled product corresponding to the IP address identified according to the IP address management table.

But, the related art described in Japanese Patent Application Laid-Open No. 2000-349803 has problems that a storage area for storing the IP address management table is required, a larger storage area is required as the controlled product increases, and the storage region is cluttered, resulting in decreasing the processing speed because the controlled product which cannot be connected directly to the Internet and the IP address of the controlled product must be registered in the IP address management table.

There are also problems that the gateway device is required to realize communications, and when it is desired to connect to a single controlled product, not only convenience cannot be enjoyed but it is necessary to maintain the management table and the network, and productivity is disturbed.

Generally, according to the communication method that electronic equipment are mutually connected by plural communication means such as a network connection and a local connection, communications can be made by the individual communication means, and data communications can be realized according to the characteristics of the communication means.

But, this communication method has problems that because the electronic equipment connected as described above is recognized as different electronic equipment by the individual communication means, a registration operation by an administrator is required to have the electronic equipment, which is judged different by the individual communication means, recognized as one and the same in order to realize seamless communications beyond the constraints of the communication means, and the working efficiency is degraded.

SUMMARY OF THE INVENTION

The present invention has been made in view of the above circumstances and provides an image forming system, an image forming method and an information terminal device in which an information terminal device and a printing device, which are connected through plural communication lines, can make data communications without depending on information of each of the communication lines.

An aspect of the present invention provides an image forming system having an information terminal device and a printing device which is connected to the information terminal device through a network and a local connection and performs a printing process of image data sent from the information terminal device, wherein the information terminal device includes a network identifier acquisition unit that obtains through the local connection a network identifier of the printing device on the network at the time of the local connection between the information terminal device and the printing device; and a data communication unit that performs data communications with the printing device through the network according to the network identifier obtained by the network identifier acquisition unit.

BRIEF DESCRIPTION OF THE DRAWINGS

An embodiment of the present invention will be described in detail based on the following figures, wherein.

DETAILED DESCRIPTION OF THE INVENTION

An embodiment of an image forming system, an image forming method and an information terminal device according to the present invention will be described in detail with reference to the accompanying drawings.

It should be noted that, as an information terminal device, there are available various devices such as personal computers (PCs), etc.; however, the following embodiment will be described with reference to an image reading device as an example of the information reading device. Moreover, the image forming system of the present invention will be described with reference to a scanner for reading images and a printer for printing but is not limited to this example and can be used for communications between peripheral equipment such as a digital camera or a PDA (Personal Digital Assistance) and a printer and communications between a server and peripheral equipment.

Figure 1:
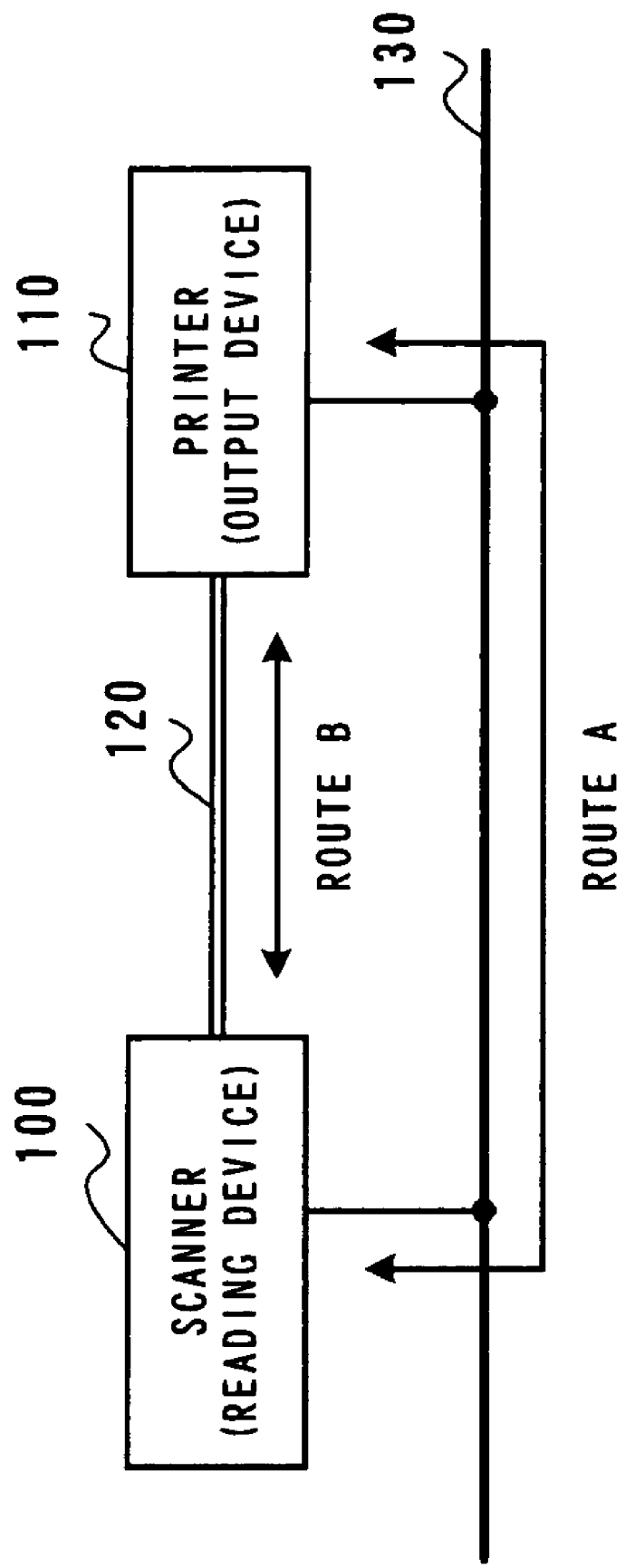
FIG. 1 is a system configuration view of an image forming system configured by applying an image forming system, an image forming method and an information terminal device according to an example of the present invention.

FIG. 1 is a system configuration view of the image forming system configured by applying the image forming system, the image forming method and the information terminal device according to an example of the present invention.

In FIG. 1, the image forming system is comprised of a scanner 100 for reading printed documents and a printer 110 for printing according to data received from the scanner 100. The scanner 100 and the printer 110 are mutually connected by two interfaces such as a local connection by a USB cable 120 and a network connection using an Ethernet (registered trademark) cable 130.

Route A, which realizes the network connection using the Ethernet (registered trademark) cable 130, treats the scanner 100 and the printer 110 as nodes on the network and realizes data communications by TCP/IP (Transmission Control Protocol/Internet Protocol) communications. In other words, data is transmitted by IP packet with a network identifier IP address determined as destination information.

And, route B which realizes the local connection using the USB cable 120 performs data communications by the local connection that a target as communication destination is connected through a dedicated route.

TCP/IP communications by the network connection using the Ethernet (registered trademark) cable 130 manages information of the printer 110 by using an MIB (Management Information Base) according to an SNMP (Simple Network Management Protocol). The information of the printer 110 to be managed as the MIB includes tray information, toner information, printing speed information, media information (paper size information, number of sheet information), color information, finisher information, duplex information, interface information and the like.

Meanwhile, the local connection using the USB cable uses information included in a class driver determined as printer class specified by a USB driver.

When the scanner 100 is turned on with the power of the printer 110 on, a request is made to the device (the printer 110 in the example shown in FIG. 1) connected by means of the USB cable 120 to obtain device information which is possessed by the device, and the device information is obtained from a response from the device having received the request. Thus, a type of the connected device in the example shown in FIG. 1 is identified as "printer".

Subsequently, it is requested to obtain the device ID possessed by the device from the device which is identified as printer, and the device ID as well as identification information allowing identifying the printer on the network are obtained from the printer which is the connected device. For example, the identification information includes the IP address, MAC address and printer name of the network identifier.

When the printer 110 is turned on with the power of the scanner 100 on, the scanner 100 receives a bus reset request from the printer 110 through the USB cable 120 and executes a bus reset. The bus reset at this time indicates initialization of the USB information and executes reallocation of the number allocated for management of the connected peripheral equipment other than the initialization or activation of the controller, generation of task and the like.

The printer 110 also receives a bus reset response from the scanner 100 and performs its initialization similarly.

In this state, when a device information acquisition request is received from the scanner 100, the device information possessed by the printer 110 is returned, and when a device ID acquisition request is received, identifier information including the IP address which is a network identifier obtained together with a previously designated device ID is created and returned.

Thus, the scanner 100 can obtain the IP address which is a network identifier of the printer by USB communications using the USB cable.

Figure 2:
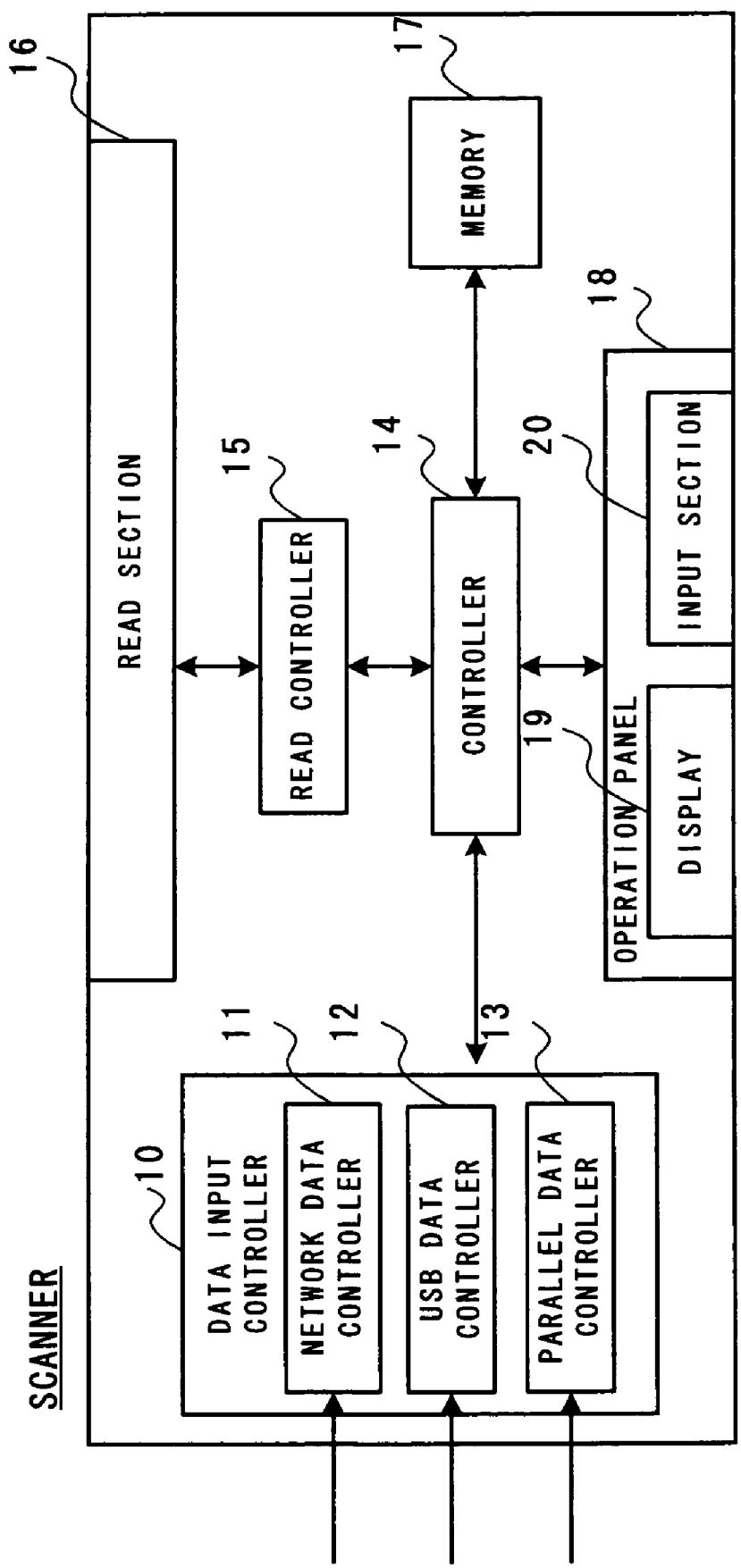
FIG. 2 is a block view showing a detail structure of a scanner.

FIG. 2 is a block view showing a detail structure of a scanner.

In FIG. 2, the scanner is comprised of a data input controller 10, a network data controller 11, a USB data controller 12, a parallel data controller 13, a controller 14, a read controller 15, a read section 16, a memory 17, an operation panel 18, a display 19 and an input section 20.

The data input controller 10 is comprised of the network data controller 11, the USB data controller 12 and the parallel data controller 13 and can communicate one another by plural communication interfaces.

The network data controller 11 makes a network connection using the Ethernet (registered trademark) cable.

The USB data controller 12 makes a USB connection by the USB cable.

The parallel data controller 13 conducts data communications by a parallel connection such as Centronics, SCSI or IDE.

These communication interfaces are switched by the printer connected to the scanner 100, and data controlled by the controller 14 is transferred to the designated printer.

The controller 14 indicates the main control of the scanner 100 and processes according to the request from the printer 110. When the bus reset request is received by the USB data controller 12 from the printer 110, the USB information stored in the memory 17 is initialized. When the bus reset is executed, the connected printer 110 is detected, and an acquisition request for device information to be sent to the detected printer 110 is generated and transmitted via the USB data controller 12.

When the device information is received from the printer 110, a type of device is identified, a request for a device ID is made to the printer which is the identified device. In response to the request, the identifier information transmitted by the printer is analyzed, and the IP address of the network identifier for identifying the printer is obtained together with the device ID by means of the network connection.

The read controller 15 controls reading of printed documents executed by the scanner 100. When reading is instructed by the user via the input section 20 of the operation panel 18, the controller 11 instructs the read controller 15 to start reading according to the given instructions, and reading is started.

The read section 16 is comprised of CCD (Charge Coupled Devices) and the like and starts reading the printed documents when the reading is executed by the read controller 15.

The memory 17 is comprised of a ROM (Read Only Memory) and a RAM (Random Access Memory) and stores a read program, a program for realizing communications with the connected printer by using plural interfaces, and the like.

The operation panel 18 is a user interface which is comprised of the display 19 and the input section 20 and used by the user to give instructions to the scanner.

The display 19 displays the contents of settings and the like to the user.

The input section 20 is comprised of buttons, arrow keys and the like to give instructions to the scanner. For example, it gives a reading instruction of printed documents and turns on or off the power.

By configuring as described above, the following process can be made.

(1) It is assumed that the scanner and the printer are mutually connected by two connection modes, the network line and the USB line, and data communications can be made bidirectionally by means of either line; the printer has a sleep function so as to stand by in a low-power power-saving mode if the printer is not used for a fixed time of period.

When the printer goes into the power-saving mode, it is general that the process to resume the printer from the power-saving mode must be made for each of the connected communication interfaces because the printer is recognized by the scanner as a different printer for each communication interface of the connection modes in the environment that the printer is connected through the plural connection modes. Therefore, a return processing function is necessary for each communication interface. In other words, the resumption of the printer cannot be made from the communication interface not having the return processing function.

Resumption from the power-saving mode to the normal mode is made by operating the printer which is in the power-saving mode from the operation panel or by printing through the network.

By applying the structure shown in FIG. 2, the device ID and the IP address which is used on the network line can be obtained through the USB line. Thus, the printer of the USB connection and the printer of the network connection can be recognized as one and the same printer.

It is because the printer connected through the USB line and the printer connected through the network line can be linked mutually by using the IP address, which is obtained through the USB line, through the network line.

Therefore, the resumption from the power-saving mode can be made by the network connection having the return processing function. The resumption from the power-saving mode can also be recognized by the USB-connected printer.

Thus, data communications by the USB connection can be made by conducting the return processing from the power-saving mode of the printer through the network line.

By configuring as described above, the IP address of the network identifier to be used for the network connection is obtained through the USB line, but it is not exclusive. It may be configured to obtain information, e.g., MAC address, printer name or the like, capable of identifying the printer on the network.

(2) It is assumed that a scanner and a printer are connected by two connection modes, the network line and the USB line, to perform data communications between them, but the USB cable is broken.

Generally, it is judged that the scanner which performs data communications under the circumstances described above cannot conduct data communications through the USB line. But, its reason cannot be judged whether the USB cable has a problem or the printer is not on.

By applying the structure shown in FIG. 2, the printer of the USB connection and the printer of the network connection are recognized as one and the same. Therefore, if information indicating the state of the printer can be obtained through the network line, it can be judged that the printer is in a normal activation state and operates normally. Accordingly, it can be judged that the USB cable or the USB communication interface has a trouble.

Therefore, the application of the present invention enables to control communications between the scanner and the printer and also enables to distinguish a trouble.

Figure 3:
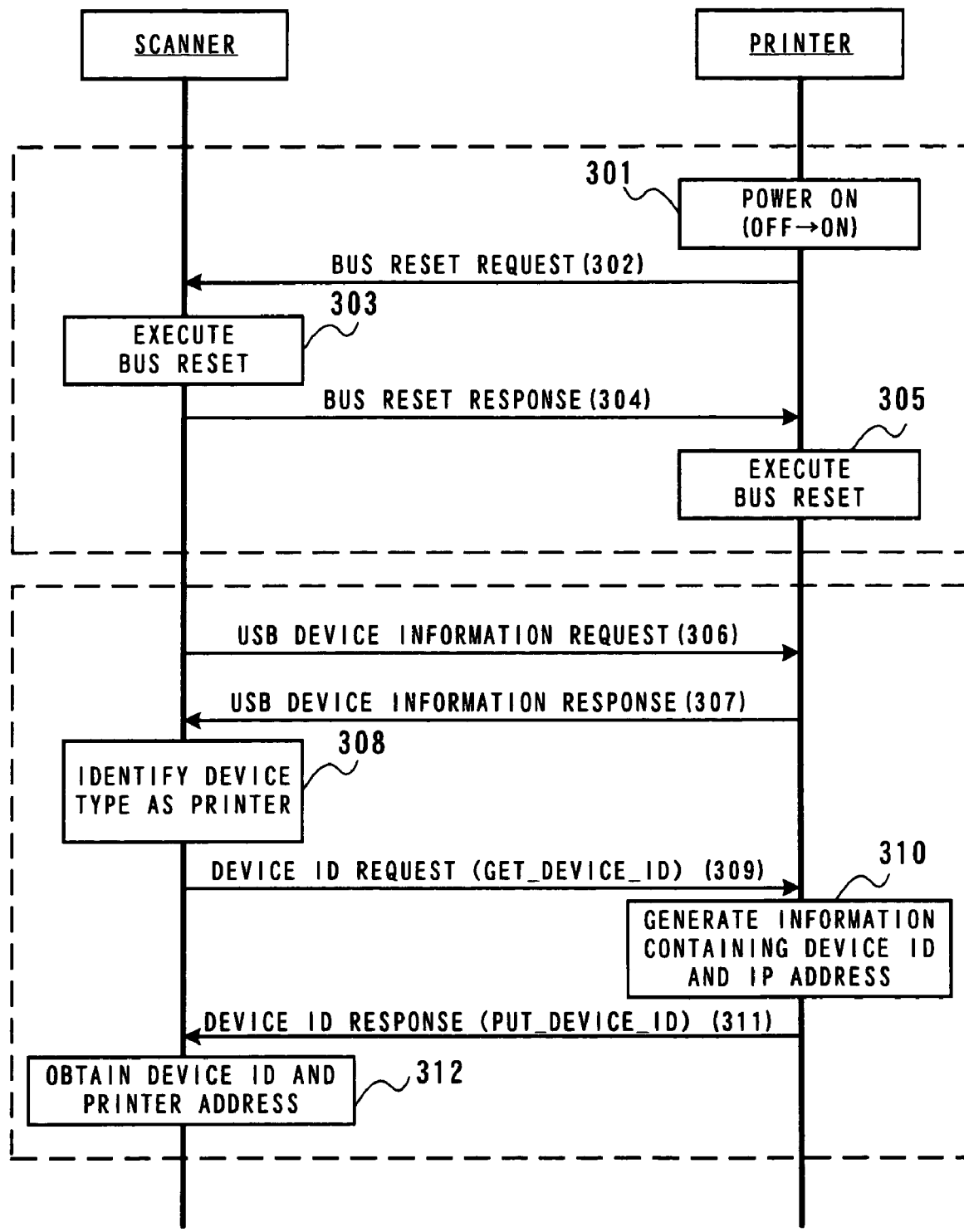
FIG. 3 is a sequence view showing USB communications between a scanner and a printer.

FIG. 3 is a sequence view showing USB communications between the scanner and the printer.

In FIG. 3, adequate time has passed after the scanner is previously turned on and the printer is turned on when it is off (301), and a bus reset request is sent from the printer to the scanner (302). Upon receiving the request, the scanner performs a bus reset process (303) and returns a bus reset response indicating that it has received the bus reset request and performed the bus reset process (304). Thus, the printer also executes the bus reset process (305).

Subsequently, the scanner sends the USB device information request to the detected printer (306), and the printer returns the previously holding device information (307).

Thus, the scanner identifies the communication destination device as printer (308). Subsequently, the scanner requests a device ID to the device which is identified as printer (309). The printer having received the request creates identifier information containing the device ID and the IP address (310) and returns to the requested scanner (311). Thus, the scanner obtains the device ID and also the IP address of the printer (312).

By processing as described above, it becomes possible to obtain the IP address to be used on the network line by the USB line, and communications can be made with the printer through the network line. Therefore, the printer can be identified as one and the same on either of the USB and network lines.

By processing as described above, the communication control system of the present invention can obtain a network address (IP address) to be used for the network communications through the network line from a communication line other than the network line.

Thus, even if communication is made by different communication interfaces, the printer can be recognized as one and the same device.

Accordingly, an effect of improving the convenience of the device and also its maintainability can be expected by applying the present invention.

The present invention provides the above-described effects by giving and receiving the IP address of the network in the exchange of the device ID information specified by USB standard by means of the USB connection which is a local interface. Same effects can also be obtained by exchanging the IP address on another interface such as IEEE 1394, Centronics or the like.

The present invention is not limited to the embodiment described above and shown in the drawings but can be practiced with appropriate modifications within the scope not modifying the subject matter.

The present invention is applicable to an image forming system, an image forming method and an information terminal device in which data communications are made between electronic equipment which are mutually connected through plural communication lines. Especially, the present invention is useful for controlling the target electronic equipment through a communication line other than the network line on the basis of the information which is obtained through the network by the electronic equipment which are mutually connected through the plural communication lines including the network line.

As described above, a first aspect of the present invention provides an image forming system having an information terminal device and a printing device which is connected to the information terminal device through a network and a local connection and performs a printing process of image data sent from the information terminal device, wherein the information terminal device includes a network identifier acquisition unit which obtains through the local connection a network identifier of the printing device on the network at the time of the local connection between the information terminal device and the printing device; and a data communication unit which performs data communications with the printing device through the network according to the network identifier obtained by the network identifier acquisition unit.

Further, a second aspect of the present invention provides the image forming system in the first aspect of the present invention, wherein the local connection may be a USB connection, and the information terminal device may obtain from the printing device an IP address as one element of a device ID of the printing device by initialization of the local connection at the time of the local connection.

Further, a third aspect of the present invention provides the image forming system in the first or second aspect of the present invention, wherein the information terminal device may be an image reading device.

Further, a fourth aspect of the present invention provides the image forming system in the third aspect of the present invention, wherein the image reading device may give a print instruction by sending image data read by the image reading device to the printing device through the local connection.

Further, a fourth aspect of the present invention provides the image forming system in the third aspect of the present invention, wherein the image reading device may give a print instruction by sending image data read by the image reading device to the printing device through the local connection.

Further, a firth aspect of the present invention provides the image forming system in the three or fourth aspect of the present invention, wherein the printing device may have a sleep function which places the printing device into a power saving state in that a power in a standby state is limited, and the image reading device may instruct the printing device through the network to return from the power saving state to a normal state.

Further, a sixth aspect of the present invention provides an image forming method using an information terminal device and a printing device, the printing device being connected to the information terminal device through a network and a local connection, for performing a printing process of image data sent from the information terminal device, the method includes obtaining in the information terminal device by a network identifier acquisition unit through the local connection a network identifier of the printing device on the network at the time of the local connection between the information terminal device and the printing device; and performing data communication with the printing device through the network according to the network identifier obtained by the network identifier acquisition unit.

Further, a seventh aspect of the present invention provides the image forming method in the sixth aspect of the present invention, wherein the information terminal device is an image reading device.

Further, an eighth aspect of the present invention provides an information terminal device which is connected to a printing device through a network and a local connection and sends image data to the printing device to give a printing instruction, the information terminal device includes a network identifier acquisition unit which obtains through the local connection a network identifier of the printing device on the network at the time of the local connection between the information terminal device and the printing device; and a data communication unit which performs data communications with the printing device through the network on the basis of the network identifier obtained by the network identifier acquisition unit.

Further, a ninth aspect of the present invention provides the information terminal device in the eighth aspect of the present invention, wherein the information terminal device is an image reading device.

According to the above-mentioned aspects of the present invention, it is configured that the information terminal device and the printing device mutually connected in the plural connection states of the network connection and the local connection and used for data communications of information which can be obtained for each connection state in another connection state, so that there is provided an effect that the information terminal device and the printing device which are separately recognized in the individual connection states can be recognized as one and the same device.

And, the information obtained by the network connection can be used for data communications in a connection state other than the network connection to realize data communications utilizing the advantages of the individual connection states. Thus, there are provided effects that the communication efficiency is improved, convenience is also improved, a trouble can be distinguished, and maintainability is remarkable.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-81694 filed on Mar. 22, 2005 including specification, claims, drawings and abstract is incorporated herein by reference in its entirety.

What is claimed is:

1. An image forming system comprising:
   an information terminal device; and
   a printing device that is connected to the information terminal device through each of a network and a local line, the printing device operating in a normal mode or, if the printing device is not used for a certain time period, operating in a power saving mode in which the printing device stands by in a lower power state than in the normal mode,
   wherein the information terminal device comprises:
      a local communication controller that controls a local communication with the printing device through the local line;
      a network communication controller that controls a network communication with the printing device through the network;
      an acquisition unit that obtains a network identifier of the printing device on the network from the printing device by the local communication with the printing device through the local line by the local communication controller; and
      a recognition unit that identifies the printing device through each of the network and the local line, and that recognizes the printing device identified through the network and the printing device identified through the local line as one and the same printing device by obtaining the network identifier with use of the acquisition unit,
   wherein the network communication controller controls the network communication with the printing device through the network according to the network identifier obtained by the acquisition unit, and resumes the printing device from the power saving mode to the normal mode by transmitting print data to the printing device through the network, and
   the recognition unit, when identifying a resumption of the printing device identified through the network, recognizes that printing through the printing device identified through the local line is also resumed.

2. The image forming system according to claim 1, wherein the local communication controller controls a communication through a USB line with the printing device,
   the information terminal device further comprises:
      an initialization controller that controls initialization of the communication through the USB line with the printing device;
      a device information acquisition unit that requests device information of the printing device to the printing device to obtain the device information from the printing device through the USB line after the initialization of the communication through the USB line by the initialization controller; and
      an IP address acquisition unit that requests an IP address of the printing device on the network to the printing device by the communication through the USB line to obtain the IP address from the printing device through the USB line after obtaining the device information by the device information acquisition unit, wherein
   the network communication controller controls a communication with the printing device having the device information obtained by the device information acquisition unit through the network according to the IP address obtained by the IP address acquisition unit.

3. The image forming system according to claim 2, wherein the information terminal device is an image reading device that is connected to the printing device through the USB line and the network, reads an image from an original, and gives a print instruction of the read image to the printing device.

4. The image forming system according to claim 3, wherein the image reading device sends image data corresponding to the read image to the printing device through the USB line to give a print instruction of the image data by the communication through the USB line with the printing device by the local communication controller.

5. The image forming system according to claim 3, wherein the image reading device sends image data corresponding to the read image to the printing device through the network to give a print instruction of the image data by the network communication through the network with the printing device by the network communication controller.

6. The image forming system according to claim 3, wherein the image reading device controls the printing device through the network by the communication with the printing device through the network by the network communication controller, while sending image data corresponding to the read image through the USB line to give a print instruction of the image data by the communication through the USB line with the printing device by the local communication controller.

7. An image forming method for an information terminal device and a printing device connected to the information terminal device through a network and a local line, the printing device performing a printing process of image data sent from the information terminal device, comprising:
   identifying the printing device through each of the network and the local line,
   obtaining in the information terminal device a network identifier of the printing device on the network through the local line by a communication with the printing device through the local line; and
   recognizing the printing device identified through the network and the printing device identified through the local line as one and the same printing device by obtaining the network identifier;
   controlling a communication with the printing device through the network according to the obtained network identifier;
   resuming the printing device from a power saving mode to a normal mode by transmitting print data to the printing device through the network; and
   recognizing, when identifying a resumption of the printing device identified through the network, that printing through the printing device indentified through the local line is also resumed.

8. The image forming method according to claim 7, comprising:
   initializing a communication through a USB line at the time of the communication through the USB line with the printing device;
   requesting device information of the printing device to the printing device by a communication through the USB line to obtain the device information from the printing device after the initialization of the communication through the USB line;

requesting an IP address of the printing device on the network to the printing device by a communication through the USB line to obtain the IP address from the printing device through the USB line after obtaining the device information; and controlling a communication with the printing device having the obtained device information through the network according to the obtained IP address.

9. The image forming method according to claim 8, wherein the information terminal device is an image reading device that is connected to the printing device through the USB line and the network, and that reads image from an original.

10. The image forming method according to claim 9, comprising:

controlling in the image reading device the printing device through the network by a communication with the printing device through the network, while sending image data corresponding to the image read from the original through the USB line to give a print instruction of the image data by the communication through the USB line with the printing device.

* * * * *